(12) United States Patent
Thomas et al.

(10) Patent No.: US 10,025,406 B2
(45) Date of Patent: Jul. 17, 2018

(54) TOUCH SCREEN BEZEL DESIGN FOR USE IN AVIATION OPERATIONS

(71) Applicant: The Boeing Company, Chicago, IL (US)

(72) Inventors: Lisa C. Thomas, Kirkland, WA (US); Michael E. Foster, Bellingham, WA (US); Mark I. Nikolic, Seattle, WA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 14/853,501

(22) Filed: Sep. 14, 2015

(65) Prior Publication Data
US 2017/0075442 A1    Mar. 16, 2017

(51) Int. Cl.
| | | |
|---|---|---|
| *H05K 7/00* | (2006.01) | |
| *H05K 5/00* | (2006.01) | |
| *G06F 3/041* | (2006.01) | |
| *G06F 1/16* | (2006.01) | |
| *G06F 3/039* | (2013.01) | |

(52) U.S. Cl.
CPC ............ *G06F 3/041* (2013.01); *G06F 1/1601* (2013.01); *G06F 3/039* (2013.01)

(58) Field of Classification Search
CPC .......................................................... G06F 1/16
USPC .................................................... 361/679.21
See application file for complete search history.

(56) References Cited

U.S. PATENT DOCUMENTS

| | | | |
|---|---|---|---|
| 6,648,715 B2 * | 11/2003 | Wiens | A63H 33/062 446/121 |
| 2007/0159466 A1 | 7/2007 | Kawell et al. | |
| 2010/0201816 A1 * | 8/2010 | Lee | B60R 1/12 348/148 |
| 2011/0109576 A1 | 5/2011 | Giannelli | |
| 2012/0127115 A1 * | 5/2012 | Gannon | G06F 3/0418 345/174 |
| 2014/0226009 A1 * | 8/2014 | Lynam | B60K 35/00 348/148 |
| 2015/0123912 A1 | 5/2015 | Nikolic et al. | |

OTHER PUBLICATIONS

Lego; Leog A7000 Laptop; www.marutan.net/comp/v3/index.php; Oct. 12, 2007.*

* cited by examiner

*Primary Examiner* — Jerry Wu
(74) *Attorney, Agent, or Firm* — Ostrager Chong Flaherty & Broitman P.C.

(57) ABSTRACT

A touch screen bezel design that is optimized for use by a pilot during in-flight operations, which include vibrations, turbulence, and other factors affecting direct interaction with a touch screen. The bezel is further designed to include bezel indices which support touch interaction by a finger when a pilot's arm is near full extension as well as in other suboptimal postures. The bezel is also designed to elicit understanding that the screen it surrounds is touch-enabled, providing a common interface look and feel for all touch-enabled screens on the flight deck.

22 Claims, 7 Drawing Sheets

TOUCH SCREEN BEZEL DESIGN FOR USE IN AVIATION OPERATIONS

BACKGROUND

The present disclosure relates in general to aircraft and in particular to systems and methods for controlling information displayed on the flight deck of an aircraft. Still more particularly, the present disclosure relates to systems and methods for controlling various displays on the flight deck of an aircraft via operator interactions with touch screens.

A pilot or other operator of an aircraft may use various displays on the flight deck of the aircraft to monitor and control the operation of various aircraft systems. Traditionally, numerous analog devices, such as mechanical gauges and dials, were used to display information on the flight deck of an aircraft. In more modern aircraft, information is provided to the pilot or other operator of the aircraft via digital electronic instrument displays. For example, information for various aircraft systems may be displayed on liquid crystal display devices, cathode ray tube display devices, or other similar display devices on the flight deck of an aircraft. For example, without limitation, such displays may include navigation displays, system displays, communication displays, information displays, flight management displays, checklist displays, other appropriate displays, or various combinations of displays.

Several display formats may be displayed on a multi-function display on the flight deck of an aircraft. A multi-function display may be used to display information to the operator of an aircraft in numerous configurable ways. For example, without limitation, a multi-function display may be configured to display a navigation route, moving map, weather information, airport information, other information, or various combinations of information all on the same display screen.

The content of the information displayed on the flight deck of an aircraft may be driven by a flight management system, other systems, or various combinations of systems on the aircraft. A flight management system is a specialized computer system that automates a wide variety of in-flight tasks, thereby reducing the workload of the aircraft flight crew.

The information displayed on the flight deck of an aircraft may be controlled to display flight information as needed. The ability to control the information displayed on the flight deck of an aircraft may simplify aircraft operation and navigation and may allow the aircraft operator to focus on the most pertinent information.

Flight decks will soon be outfitted with touch-enabled screens (hereinafter "touch screens") for the pilots to interact directly with the information displays, compared to the use of an intermediary control device (e.g., a touchpad or dial). Because of the unique environment of flight, pilots contend with vibrations and turbulence, which affect their ability to smoothly, easily, and accurately interact with touch screens. Given the design constraints of displays and hardware on the flight deck, the touch screens are typically at arm length from the pilots, requiring them to nearly or fully extend their arms to reach the portion of the touch screen they wish to interact with. Since aircraft displays are typically anchored to the flight deck, vibration and turbulence can be transmitted directly to the display without any damping, making it difficult for the pilot to move his hand or fingers rapidly and precisely during flight.

Current bezel designs are not optimized for this type of operation or to overcome the foregoing limitations. Current bezels are typically flat and smooth (as in the edges of a typical computer monitor) and do not enable effective bracing for a hand to interact with a display where both are being shaken by turbulence or vibrations.

SUMMARY

The subject matter disclosed in detail below is directed to a touch screen bezel design that is optimized for use by a pilot during in-flight operations, which include vibrations, turbulence, and other factors affecting direct interaction with a touch screen. The bezel is further designed to include bezel indices which support touch interaction by a finger when a pilot's arm is near full extension as well as in other suboptimal postures. The bezel is also designed to elicit understanding that the screen it surrounds is touch-enabled, providing a common interface look and feel for all touch-enabled screens on the flight deck.

In accordance with a preferred embodiment, the bezel is designed to have bezel indices in the form of protruding segments or projections having angled ridged surfaces which enhance finger gripping during pilot interaction with a touch screen. As used herein, the term touch screen means a display which contains any type or combination of user input sensor(s) integrated into a display assembly, which can detect, track and output the coordinates of finger or stylus position on or near the display surface. As used herein, the term "finger" should be construed to include any one of the following: a thumb, an index finger, a middle finger, a ring finger, and a little finger. As used hereinafter, the term "length", when used to describe a bracing index, is measured in a horizontal direction in a plane parallel to a plane of the touch screen.

In accordance with various embodiments, the bezel design may include one or more of the following features: (a) the vertical sides have slightly rounded profiles and are studded with raised dots to support finger gripping and prevent vertical sliding; (b) the vertical sides have one or more bracing indices that can be used to anchor or rest a finger to prevent vertical sliding and to provide better support for fine-motor movements; (c) the horizontal sides are angled such that the lower edge extends out further than the upper edge, providing a ledge to brace one or more fingers when accessing upper and lower portions of the screen; and (d) the horizontal sides have several ridges running horizontally along length of the ledges to further support bracing and prevent vertical slide-off of the fingers. In addition to supporting bracing during in-flight operation, the foregoing features improve bracing for pre- and post-flight operation (when the plane is still). Further, these features provide an overall distinctive characteristic look and feel that can be used to visually signal that a display screen is touch-enabled (by contrast, non-touch-enabled screens would retain the flat, smooth bezels, visually identifying them as non-touch-enabled).

One aspect of the subject matter disclosed in detail below is an apparatus comprising a touch screen and a bezel that is attached to or integrally formed with an outer periphery of the touch screen to form a boundary of a touch screen area, wherein: the bezel comprises first and second sides that intersect at a first corner, and third and fourth sides that intersect at a second corner, the second and third sides intersecting at a third corner, and the first and fourth sides intersecting at a fourth corner; one of the first through fourth sides comprises a bracing index; and the bracing index comprises a body having a ridged surface disposed at an acute angle relative to the touch screen, the ridged surface comprising a multiplicity of ridges disposed at different distances from a back surface of the at least one of the first through fourth sides. The body of the bracing index has a shape which approximates a truncated wedge having a pair of trapezoidal side faces, and the multiplicity of ridges are disposed on a face that connects the trapezoidal side faces.

In accordance with some embodiments, one bracing index of the type described in the preceding paragraph may be formed on each of the second and fourth sides, extending along the length of (i.e., parallel to) the second and fourth sides, and one or more bracing indices of the type described in the preceding paragraph may be formed on each of the first and third sides, extending across the width of (i.e., perpendicular to) the first and third sides. In addition, the first and third sides may be provided with respective multiplicities of raised dots projecting from rounded front surface areas not occupied by bracing indices.

Another aspect of the subject matter disclosed in detail below is an apparatus comprising a touch screen and a bezel that is attached to or integrally formed with an outer periphery of the touch screen to form a boundary of a touch screen area, wherein: the bezel comprises first and second sides that intersect at a first corner, and third and fourth sides that intersect at a second corner, the second and third sides intersecting at a third corner, and the first and fourth sides intersecting at a fourth corner; and the first side comprises a first elongated body having a front surface with a rounded profile and a first bracing index protruding from the front surface of the first elongated body, wherein the first bracing index comprises a first body attached to or integrally formed with the first elongated body, the first body having a first uneven surface disposed at an acute angle relative to the touch screen and configured to exert pressure unevenly when pressed by a finger. The first side may further comprise respective multiplicities of raised dots arranged in respective patterns and projecting from the first elongated member in respective raised dot surface area on opposite sides of the first bracing index.

In accordance with the embodiments disclosed herein, the uneven surface of the first body comprises a first array of bar-shaped projections separated by respective spaces and extending in a direction which is perpendicular to a lengthwise direction of the first elongated member of the first side. The bar-shaped projections of the first array of bar-shaped projections are disposed at different distances from a back surface of the first side.

In accordance with some embodiments, the first side further comprises a second bracing index protruding from the front surface of the first elongated body, wherein the second bracing index comprises a second body attached to or integrally formed with the first elongated body, the second body having a second uneven surface disposed at the acute angle relative to the touch screen and configured to exert pressure unevenly when pressed by a finger. In one implementation, the first and second bracing indices have a length not greater than a width of the first side.

In accordance with some embodiments, the second side comprises a second elongated body and a second bracing index protruding from the second elongated body, wherein the second bracing index comprises a second body attached to or integrally formed with the second elongated body, the second body having an uneven surface disposed at an acute angle relative to the touch screen and configured to exert pressure unevenly when pressed by a finger.

In the embodiments briefly described in the preceding paragraph, the uneven surface of the first body comprises a first array of mutually parallel bar-shaped projections that extend in a direction which is perpendicular to the first side, and the uneven surface of the second body comprises a second array of mutually parallel bar-shaped projections that extend in a direction which is parallel to the second side.

A further aspect of the subject matter disclosed in detail below is a bezel comprising first and second sides that intersect at a first corner, and third and fourth sides that intersect at a second corner, the second and third sides intersecting at a third corner, and the first and fourth sides intersecting at a fourth corner, wherein: the first side comprises a first bracing index and the second side comprises a second bracing index; the first bracing index comprises a first body having a first ridged surface disposed at an acute angle relative to the touch screen, the first ridged surface comprising a first multiplicity of ridges disposed at different distances from a back surface of the first side; the first body has a shape which approximates a truncated wedge having a pair of trapezoidal side faces, the first multiplicity of ridges being disposed on a first face that connects the trapezoidal side faces of the first body and extending perpendicular to the first side; the second bracing index comprises a second body having a second ridged surface disposed at an acute angle relative to the touch screen, the second ridged surface comprising a second multiplicity of ridges disposed at different distances from a back surface of the second side; and the second body has a shape which approximates a truncated wedge having a pair of trapezoidal side faces, the second multiplicity of ridges being disposed on a second face that connects the trapezoidal side faces of the second body and extending perpendicular to the second side. The first bracing index may have a length not greater than a width of the first side and the second bracing index may have a length not less than a distance between the first and third sides.

In accordance with the embodiments disclosed in detail below, the third side comprises a third bracing index and the fourth side comprises a fourth bracing index; the third bracing index comprises a third body having a third ridged surface disposed at an acute angle relative to the touch screen, the third ridged surface comprising a third multiplicity of ridges disposed at different distances from a back surface of the third side; the third body has a shape which approximates a truncated wedge having a pair of trapezoidal side faces, the third multiplicity of ridges being disposed on a third face that connects the trapezoidal side faces of the third body and extending perpendicular to the third side; the fourth bracing index comprises a fourth body having a fourth ridged surface disposed at an acute angle relative to the touch screen, the fourth ridged surface comprising a fourth multiplicity of ridges disposed at different distances from a back surface of the fourth side; and the fourth body has a shape which approximates a truncated wedge having a pair of trapezoidal side faces, the fourth multiplicity of ridges being disposed on a fourth face that connects the trapezoidal side faces of the fourth body and extending perpendicular to the fourth side.

It should be appreciated that the number of bracing indices on each of the first and third sides of the bezel may be greater than one. The number bracing indices on the first and third sides may depend on the length of the first and third sides, which in turn will depend on the height of the display unit which the bezel is attached to or integrally formed with. The first and third sides of a bezel designed for use with a large display unit may be provided with more bracing indices than are provided on the first and third sides of a bezel designed for use with a small display unit.

Other aspects of bezels designed to facilitate the use of touch screens on flight decks of aircraft are disclosed below.

BRIEF DESCRIPTION OF THE DRAWINGS

Reference will hereinafter be made to the drawings in which similar elements in different drawings bear the same reference numerals.

DETAILED DESCRIPTION

Touch screen systems having bezels designed to optimize use by a pilot during in-flight operations will now be described with reference to a particular embodiment for the purpose of illustration. More specifically, the embodiment shown in the drawings shows a bezel having respective pairs of bracing indices on the left and right sides and respective bracing indices on the upper and lower sides. It should be appreciated, however, that in accordance with the concepts disclosed herein, one or more bezel indices may be provided on each side.

Figure 1:
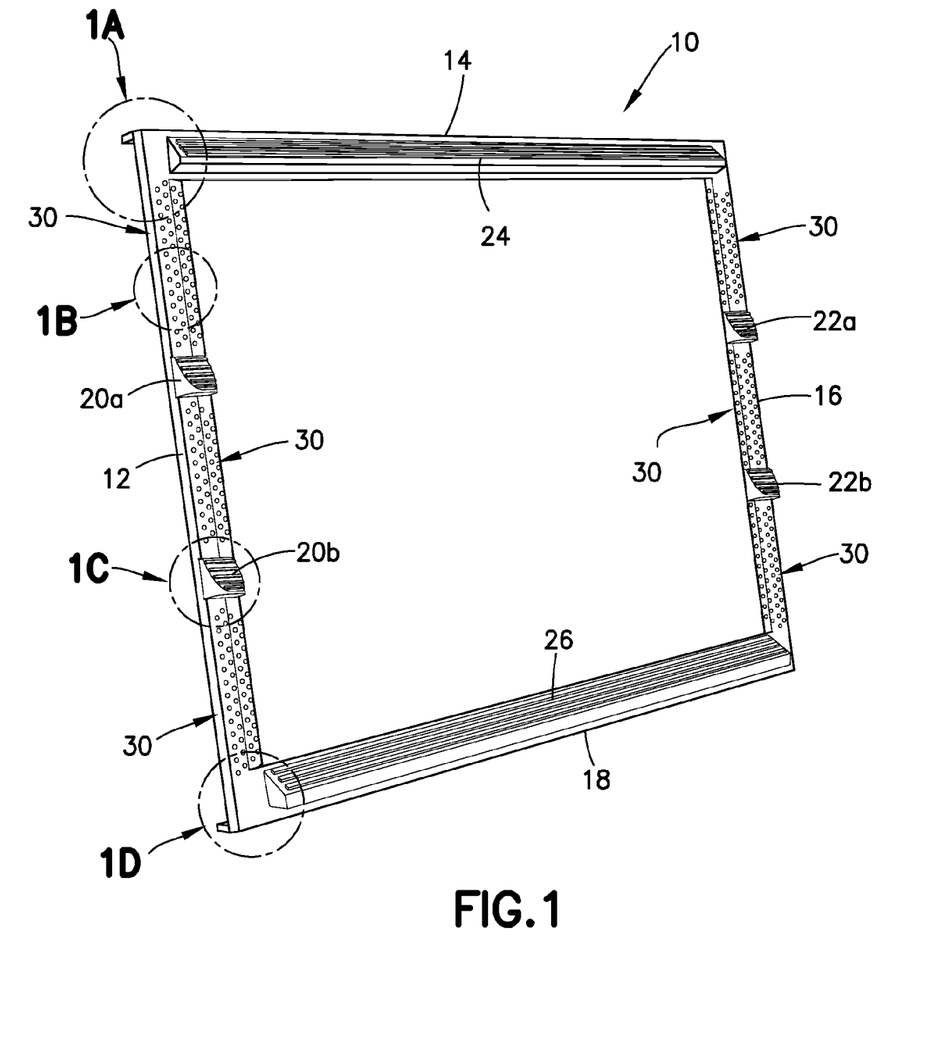
FIG. 1 is a diagram representing an isometric view of a touch screen bezel for use in aviation operations in accordance with one embodiment.
Figure 1A:
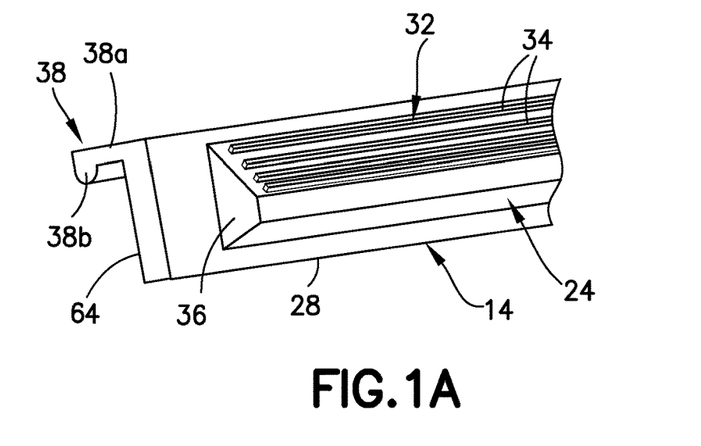
FIGS. 1A through 1D are diagrams representing isometric views of respective portions of the bezel depicted in FIG. 1, the location of the respective portions being indicated in FIG. 1 by ellipses respectively labeled 1A through 1D.

FIG. 1 is a diagram representing an isometric view of a touch screen bezel 10 for use in aviation operations in accordance with one embodiment. The bezel 10 comprises a left side 12, an upper side 14, a right side 16, and a lower side 18 which are connected to form a generally rectangular frame surrounding a touch screen (not shown in FIG. 1). The left side 12 and upper side 14 intersect at a first (i.e., upper left-hand) corner; and the right side 14 and lower side 18 intersect at a second corner (i.e., lower right-hand) opposite to the first corner. In addition, the upper side 14 and right side 16 intersect at a third (i.e., upper right-hand) corner; and the left side 12 and lower side 18 intersect at a fourth (i.e., lower left-hand) corner opposite to the third corner. As seen in FIGS. 1A and 1D, the bezel 10 further comprises upper and lower snap latch features 38 and 40 which can be snapped onto or latched to a display unit having a touch screen. This attachment method relies on the flexibility of the bezel 10, which may be made of plastic, metal, elastomer, or other suitably flexible material.

Still referring to FIG. 1, the left side 12 comprises a first left bracing index 20a and a second left bracing index 20b, which may have substantially the same geometry and a length not greater than the width of the left side 12. The left bracing indices 20a and 20b are separated from each other and from the respective nearest corner by respective dotted regions 30. Similarly, the right side 16 comprises a first right bracing index 22a and a second right bracing index 22b, which may have substantially the same geometry as that of left bracing indices 20a and 20b, and a length not greater than the width of the right side 16. The right bracing indices 22a and 22b are also separated from each other and from the respective nearest corner by respective dotted regions 30. In addition, the upper site 14 comprises an upper bracing index 24, while the lower side 18 comprises a lower bracing index 26. Each of the upper and lower bracing indices 24, 26 may have a length not less than the distance between the left and right sides 12, 16. Optionally, the upper and lower bracing indices 24, 26 could be divided into multiple segments. The bracing indices may be integrally formed with or attached to respective elongated bodies of the four sides.

FIG. 1A is a diagram representing an isometric view (magnified in scale) of the upper left-hand corner and an adjacent portion of the upper side 14 of the bezel 10 depicted in FIG. 1. Although FIG. 1A shows only a portion of the upper bracing index 24, in the particular embodiment depicted in FIG. 1, the upper bracing index 24 has a substantially constant profile along its length. However, it should be appreciated that a constant profile is not a requirement.

Still referring to FIG. 1A, the upper side 14 comprises an elongated body 28 and an upper bracing index 24 that protrudes from a front surface of the elongated body 28. The upper bracing index 24 comprises a body having an angled ridged surface 32 disposed at an acute angle relative to the front surface of the elongated body 28. The angled ridged surface 32 comprises a multiplicity of ridges 34 disposed at different distances from a back surface 64 (not visible in FIG. 1A) of the elongated body 28 of the upper side 14. The body of the upper bracing index 24 has a shape which approximates a truncated wedge having a pair of trapezoidal side faces 36 (only one of which is visible in FIG. 1A). The ridges 34 are disposed on the angled ridged face 32 and extend in parallel with the upper side 14. The angled ridged face 32 connects respective edges of the trapezoidal side faces 36.

The upper bracing index 24 is angled such that its lower edge extends out further from the front surface of the elongated body 28 than does the upper edge, providing a ledge to brace one or more fingers when accessing upper and lower portions of the touch screen (not shown in FIG. 1A). In addition, the ridges 34 run horizontally along the length of the ledges to further support bracing and prevent vertical slide-off of the fingers.

Figure 1B:
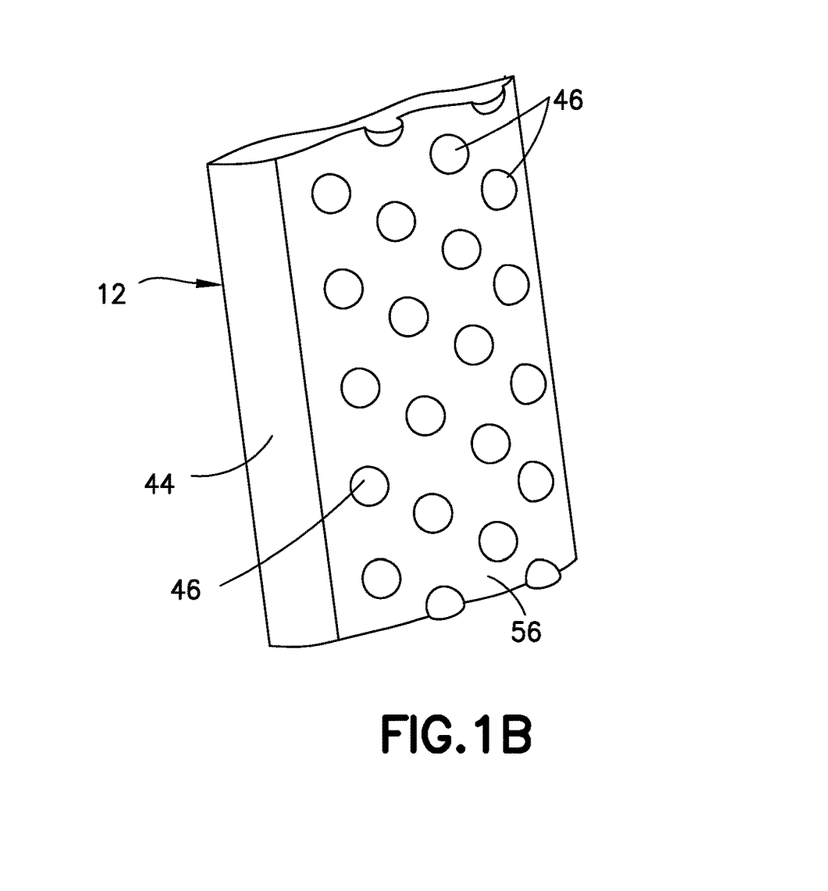

FIG. 1B is a diagram representing an isometric view (magnified in scale) of a portion of the uppermost dotted region 30 on the left side 12 of the bezel 10 depicted in FIG. 1. The left side 12 comprises an elongated body 44 having a slightly rounded front surface 56. Each dotted region 30 comprises a multiplicity of raised dots 46 which project from the slightly rounded front surface 56. The dotted regions are studded with raised dots 46 to support finger gripping and prevent vertical sliding.

Figure 1C:
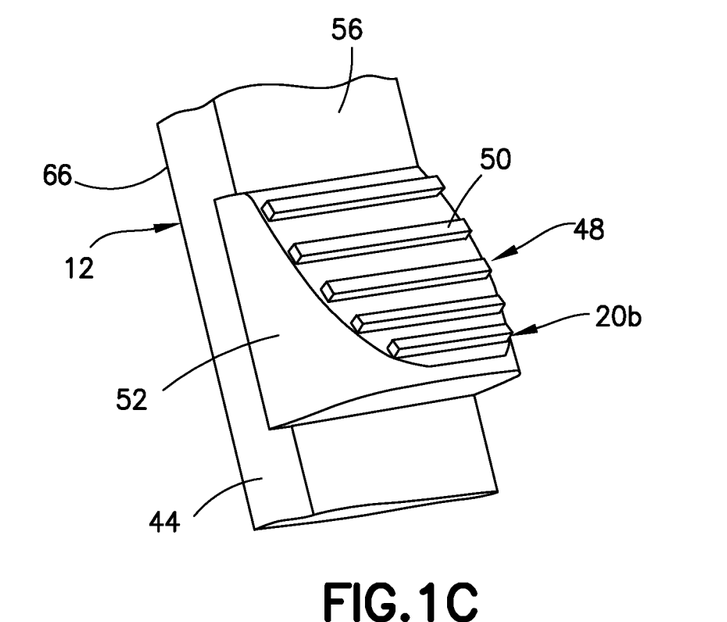
Figure 1D:
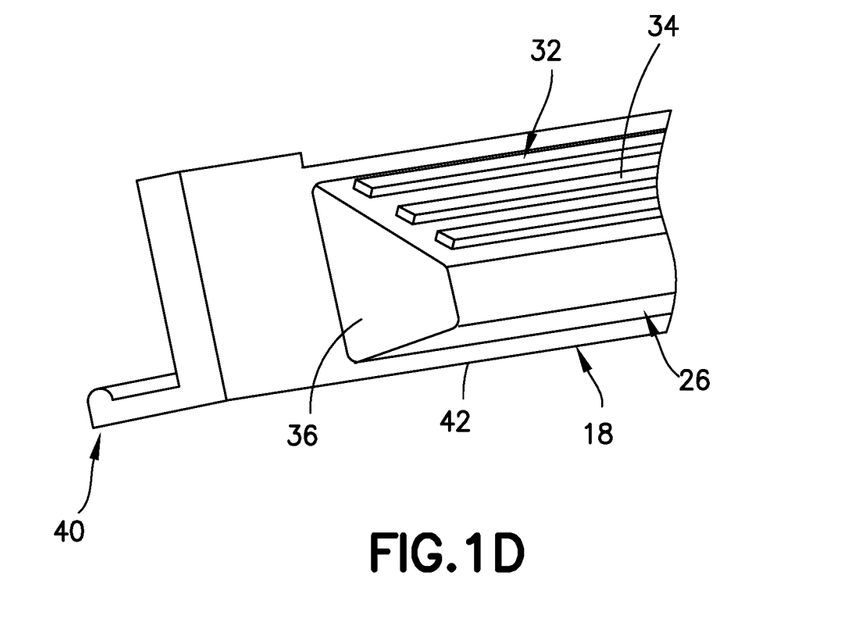

FIG. 1C is a diagram representing an isometric view (magnified in scale) of a portion of the left side 12 of the bezel 10 depicted in FIG. 1, which portion has the second left bracing index 20b formed thereon or attached thereto. The second left bracing index 20b protrudes from the front surface 56 of the elongated body 44. The second left bracing index 20b comprises a body having an angled ridged surface 48 disposed at an acute angle relative to the front surface 56.

The angled ridged surface 48 comprises a multiplicity of ridges 50 disposed at different distances from a back surface 66 (not visible in FIG. 1C) of the elongated body 44. The body of the second left bracing index 20b has a shape which approximates a truncated wedge having a pair of trapezoidal side faces 52 (only one of which is visible in FIG. 1C). The ridges 50 are disposed on the angled ridged face 48 and extend perpendicular to the left side 12. The angled ridged face 48 connects respective edges of the trapezoidal side faces 52.

The second left bracing index 20b is angled such that its lower edge extends out further from the front surface 56 of the elongated body 44 than does the upper edge, providing a protruding segment to brace one or more fingers when accessing upper and lower portions of the touch screen (not shown in FIG. 1C). In addition, the ridges 50 run horizontally along the length of the protruding segment to support bracing and prevent vertical slide-off of the finger.

The first left bracing index 20a on the left side 12 and the first and second right bracing indices 22a and 22b on the right side 16 may have a geometry which is similar, if not identical to, the geometry of the second left bracing index 20b. These bracing indices can be used to anchor or rest a finger to prevent vertical sliding and to provide better support for fine-motor movements.

FIG. 1D is a diagram representing an isometric view (magnified in scale) of the lower left-hand corner and an adjacent portion of the lower side 18 of the bezel 10 depicted in FIG. 1. Although FIG. 1D shows only a portion of the lower bracing index 26, in the particular embodiment depicted in FIG. 1, the lower bracing index 26 has a substantially constant profile along its length. However, as previously noted, a constant profile is not a requirement.

Still referring to FIG. 1D, the lower side 18 comprises an elongated body 42 and a lower bracing index 26 that protrudes from a front surface of the elongated body 42. The geometry of the lower bracing index 26 may be similar, if not identical, to the geometry of the upper bracing index 24 previously described with reference to FIG. 1A. However, the shape and dimensions of the ridges 34 and the trapezoidal side faces 36 and the angle of the angled ridged surface 32 of the lower bracing index 26 may differ from the corresponding features of the upper bracing index 24.

Although the bracing indices depicted in FIGS. 1A, 1C and 1D have angled surfaces with ridges, other uneven surfaces may be employed provided that they are disposed at an acute angle relative to the touch screen and configured to exert pressure unevenly when pressed by a finger, thereby generating frictional force which resists sliding of the contacting finger in a vertical direction.

Figure 2:
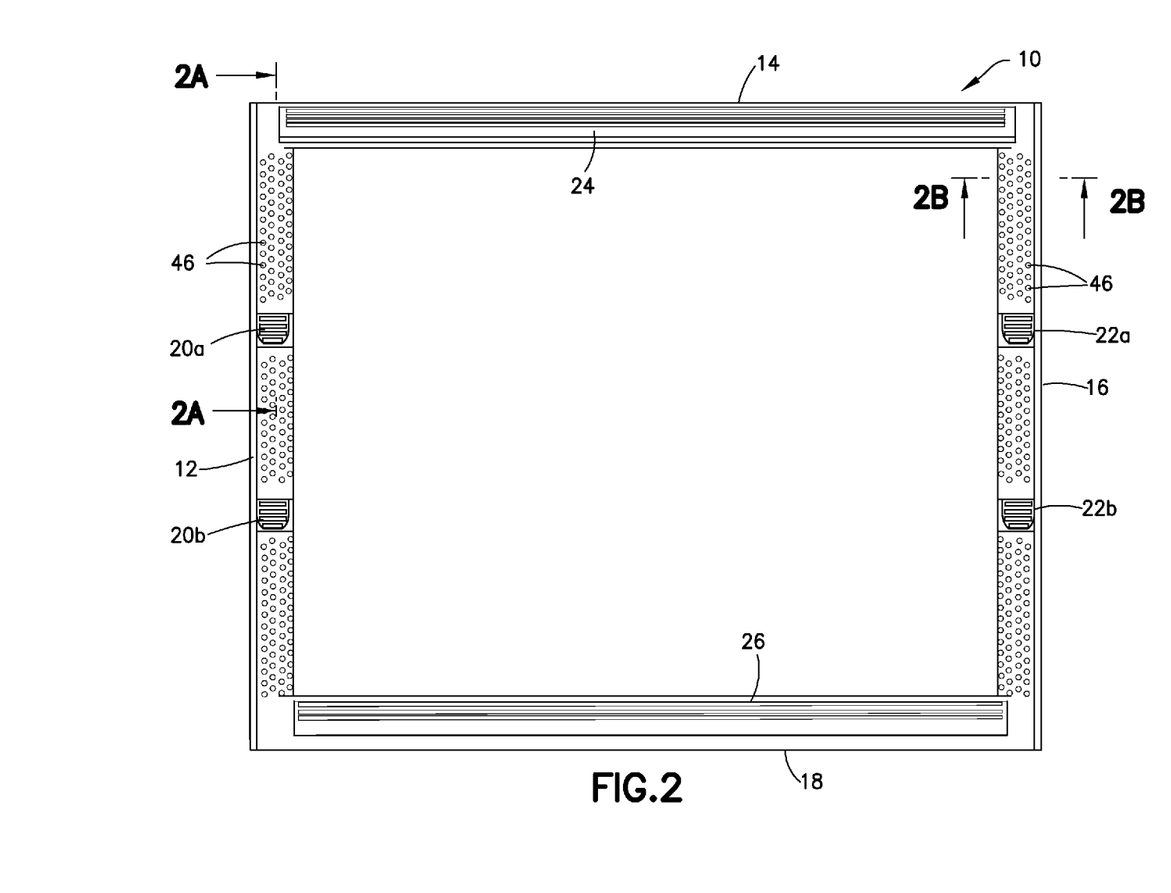
FIG. 2 is a diagram representing a front elevation view of the bezel depicted in FIG. 1.

FIG. 2 is a diagram representing a front elevation view of the bezel 10 depicted in FIG. 1. The bezel 10 has a rectangular shape. The left side 12 and right side 16 have equal widths and are parallel to a vertical axis; the upper side 14 and lower side 18 are parallel to a horizontal axis. As seen in FIG. 2, each of the bracing indices 20a, 20b, 22a and 22b may have a length not greater than the width of the left and right sides 12, 16, while each of the bracing indices 24 and 26 may have a length not less than a distance between the left and right sides 12, 16.

Figure 2A:
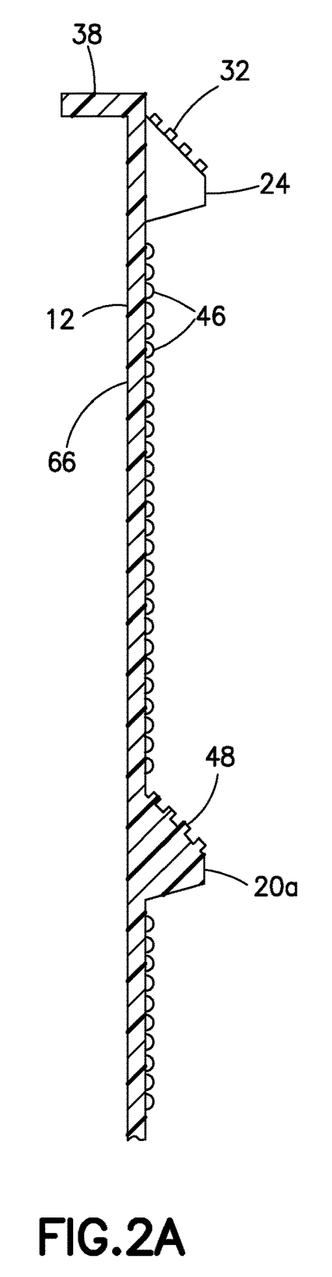
FIG. 2A is a diagram representing a sectional view of a portion of one vertical side of the bezel depicted in FIG. 2, the section being taken along the vertical solid line labeled "View A" in FIG. 2.

FIG. 2A is a diagram representing a sectional view of a portion of the left side 12 of the bezel 10 depicted in FIG. 2, the section being taken along the vertical solid line labeled "View A" in FIG. 2. This view shows the generally trapezoidal profiles of the bracing indices 24 and 20a (if one disregards the uneven profiles of the respective angled ridged surfaces 32 and 48).

Figure 2B:
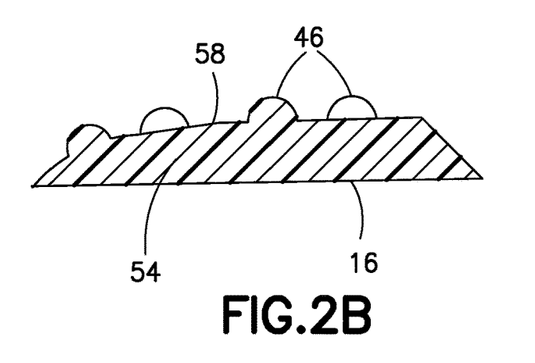
FIG. 2B is a diagram representing a sectional view of the other vertical side of the bezel depicted in FIG. 2, the section being taken along the horizontal solid line labeled "View B" in FIG. 2.

FIG. 2B is a diagram representing a sectional view of the right side 16 of the bezel 10 depicted in FIG. 2, the section being taken along the horizontal solid line labeled "View B" in FIG. 2. The profile of the right side 16 may be a mirror image of the profile of the left side 12. More specifically, the right side 16 comprises an elongated body 54 having a slightly rounded front surface 58. Each dotted region 30 of the right side 16 comprises a multiplicity of raised dots 46 which project from the slightly rounded front surface 58. The dotted regions are studded with raised dots 46 to support finger gripping and prevent vertical sliding.

Figure 3:
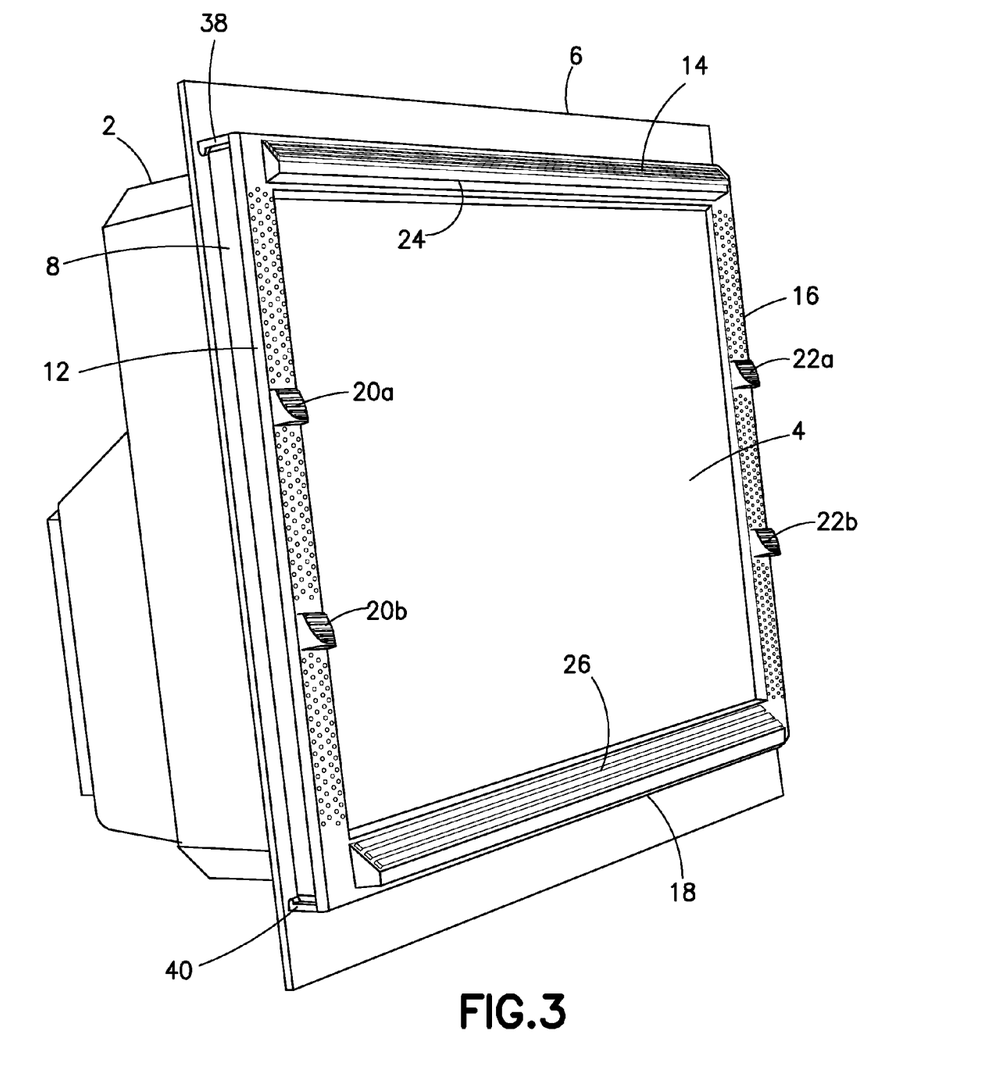
FIG. 3 is a diagram representing an isometric view of the bezel depicted in FIG. 1 attached to a display unit using a snap-on method of attachment.
Figure 4:
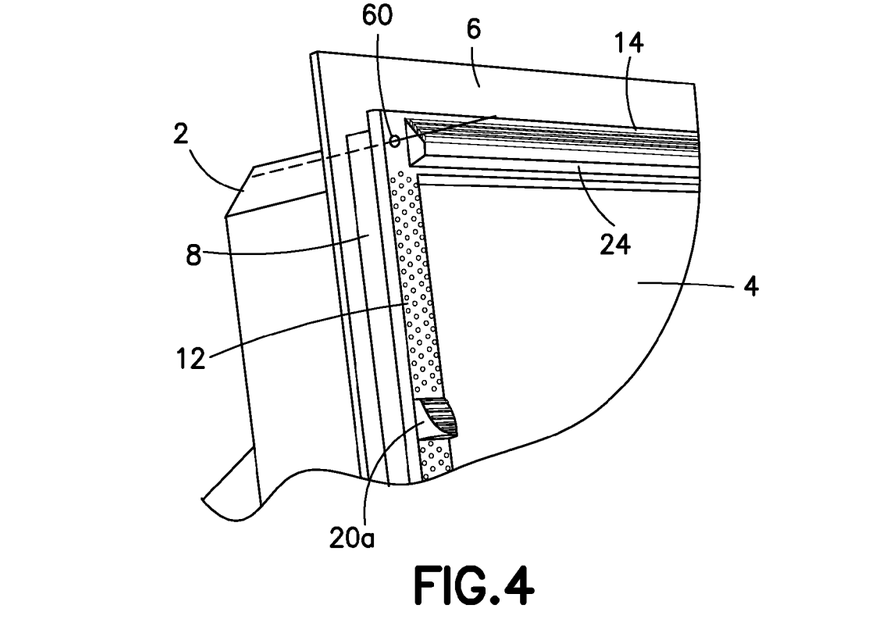
FIGS. 4 and 5 are diagrams representing isometric views of the bezel depicted in FIG. 1 attached to a display unit using respective alternative methods of attachment.
Figure 5:
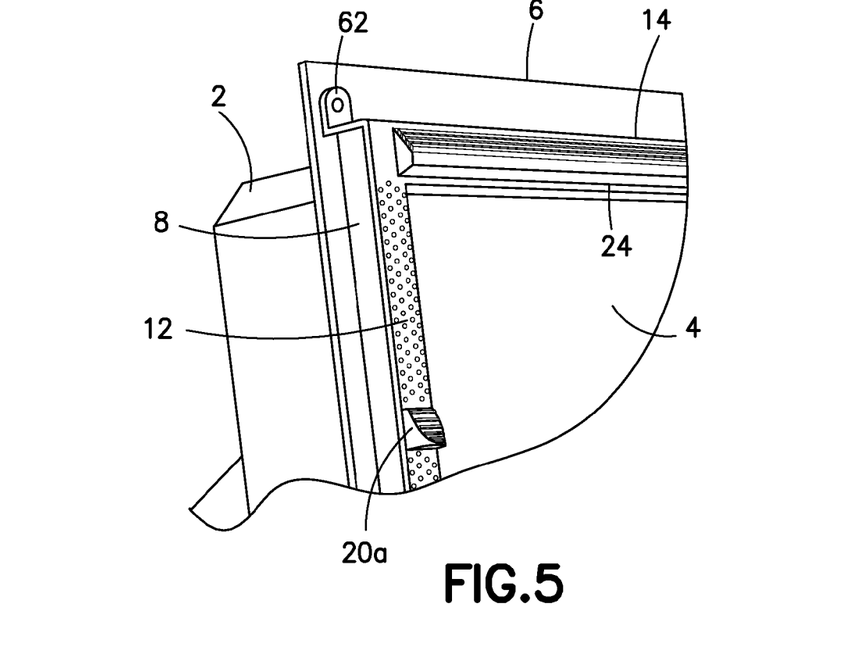

Various methods for attaching the bezel 10 to a display unit 2 having a touch screen 4 are the FIGS. 3-5. For the purpose of illustration, embodiments will be depicted in which the display unit 2 is attached to a panel 6 on a flight deck.

In accordance with one attachment method depicted in FIG. 3, the bezel 10 depicted in FIG. 1 can be attached to a display unit 2 using the upper and lower snap latch features 38 and 40 depicted in FIGS. 1A and 1D. As seen in FIG. 1A, the snap latch feature 38 is in the form of a flexible member 38a having a downward projection 38b. The flexible member 38a is designed to spring back to a neutral position in response to being bent upward. The projection 38b is designed to latch behind an edge formed on the touch screen casing 8. The snap latch feature 40 may have a similar construction. There are other ways to implement a bezel with a display unit having a touch screen. For example, the bezel can be attached via clips, adhesive or fasteners.

In accordance with an alternative attachment method depicted in FIG. 4, the bezel 10 can be attached to the panel 6 through the touch screen casing 8 by means of the same fasteners which are used to attach the display unit 2 to the panel 6. Each corner of the bezel may be provided with an aperture 60 for receiving a respective fastener. Only one aperture 60 is shown in FIG. 4, along with a dashed line indicating an axis of the fastener.

In accordance with a further attachment method depicted in FIG. 5, the bezel 10 can be fastened to the panel 6 independently by providing a bracket 62 adjacent each corner of the bezel 10. Only one bracket 62 is shown in FIG. 5.

If the bezel area around the display unit is found to be too dark to locate bracing easily, transilluminated contact points can be provided on the bezel for night operations.

While apparatus, devices and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The invention claimed is:

1. An apparatus comprising a touch screen and a bezel that is attached to or integrally formed with an outer periphery of said touch screen to form a boundary of a touch screen area, wherein:

said bezel comprises first and second sides that intersect at a first corner, and third and fourth sides that intersect at a second corner, said second and third sides intersecting at a third corner, and said first and fourth sides intersecting at a fourth corner to form a generally rectangular frame surrounding the touch screen area with said first and third sides disposed vertically and said second and fourth sides disposed horizontally;

said first side having a front surface disposed adjacent to said touch screen and comprising a first bracing index that is integrally formed with or attached to the first side and projects from said front surface of said first side; and said first bracing index comprises a first body having a first ridged surface disposed at an acute angle relative to said touch screen, said first ridged surface comprising a first multiplicity of ridges disposed at different distances from a back surface of said first side, wherein said first ridged surface is located to be used to anchor or rest a finger to prevent vertical sliding and to provide support for fine-motor movements during touching of said touch screen.

2. The apparatus as recited in claim 1, wherein said first body has a shape which approximates a truncated wedge having a pair of trapezoidal side faces, and said first multiplicity of ridges are disposed on a face that connects said trapezoidal side faces.

3. The apparatus as recited in claim 2, wherein said first multiplicity of ridges are disposed horizontally.

4. The apparatus as recited in claim 3, wherein said first side further comprises a second bracing index that is integrally formed with or attached to the first side, projects from said front surface of said first side and is spaced apart from said first bracing index, and said second bracing index comprises a second body having a second ridged surface disposed at an acute angle relative to said touch screen, said second ridged surface comprising a second multiplicity of ridges disposed at different distances from said back surface of said first side.

5. The apparatus as recited in claim 4, wherein said first side further comprises a multiplicity of raised dots projecting from said front surface of said first side and disposed between said first and second bracing indices.

6. The apparatus as recited in claim 3, wherein said third side is disposed adjacent to said touch screen and comprises a second bracing index that is integrally formed with or attached to the third side and projects from a front surface of said third side, and said second bracing index comprises a second body having a second ridged surface disposed at an acute angle relative to said touch screen, said second ridged surface comprising a second multiplicity of ridges disposed at different distances from a back surface of said third side.

7. The apparatus as recited in claim 3, wherein said second side is disposed adjacent to said touch screen and comprises a second bracing index that is integrally formed with or attached to the second side and projects from a front surface of said second side, and said second bracing index comprises a second body having a second ridged surface disposed at an acute angle relative to said touch screen, said second ridged surface comprising a second multiplicity of ridges disposed at different distances from a back surface of said second side.

8. The apparatus as recited in claim 7, wherein said first bracing index has a length not greater than a width of said first side and said second bracing index has a length much greater than the length of said first bracing index.

9. The apparatus as recited in claim 8, wherein said second bracing index has a length not less than a distance between said first and third sides.

10. The apparatus as recited in claim 1, wherein said first multiplicity of ridges of said first bracing index are disposed horizontally.

11. The apparatus as recited in claim 10, wherein said second side is disposed adjacent to said touch screen and comprises a second bracing index that is integrally formed with or attached to the second side and projects from a front surface of said second side, said second bracing index comprises a second body having a second ridged surface disposed at an acute angle relative to said touch screen, and said second ridged surface comprises a second multiplicity of ridges disposed horizontally.

12. An apparatus comprising a touch screen and a bezel that is attached to or integrally formed with an outer periphery of said touch screen to form a boundary of a touch screen area, wherein: said bezel comprises first and second sides that intersect at a first corner, and third and fourth sides that intersect at a second corner, said second and third sides intersecting at a third corner, and said first and fourth sides intersecting at a fourth corner to form a generally rectangular frame surrounding the touch screen area with said first and third sides disposed vertically and said second and fourth sides disposed horizontally; and said first side is disposed adjacent to said touch screen and comprises a first elongated body having a front surface and a first bracing index protruding from said front surface of said first elongated body, wherein said first bracing index comprises a first body attached to or integrally formed with said first elongated body, said first body having a first uneven surface disposed at an acute angle relative to said touch screen and configured to exert pressure unevenly when pressed by a finger; and said uneven surface of said first body comprises a first array of ridges extending horizontally and separated by respective different spaces.

13. The apparatus as recited in claim 12, wherein said uneven surface of said first body comprises a first array of ridges separated by respective spaces and extending horizontally.

14. The apparatus as recited in claim 12, wherein said ridges of said first array of ridges are disposed at different distances from a back surface of said first elongated body.

15. The apparatus as recited in claim 12, wherein:
said first side further comprises a second bracing index protruding from said front surface of said first elongated body;
said second bracing index comprises a second body attached to or integrally formed with said first elongated body; and
said second body has a second uneven surface disposed at said acute angle relative to said touch screen and configured to exert pressure unevenly when pressed by a finger.

16. The apparatus as recited in claim 15, wherein said first and second bracing indices have a length not greater than a width of said first side.

17. The apparatus as recited in claim 12, wherein:
said second side is disposed adjacent to said touch screen and comprises a second elongated body having a front surface and a second bracing index protruding from said front surface of said second elongated body;
said second bracing index comprises a second body attached to or integrally formed with said second elongated body; and
said second body has an uneven surface disposed at an acute angle relative to said touch screen and configured to exert pressure unevenly when pressed by a finger.

18. The apparatus as recited in claim 17, wherein said uneven surface of said first body comprises a first array of mutually parallel ridges that extend horizontally, and said uneven surface of said second body comprises a second array of mutually parallel ridges that extend horizontally.

19. The apparatus as recited in claim 12, wherein said first side further comprises a multiplicity of raised dots arranged in a pattern and projecting from said front surface of said first elongated member in a raised dot surface area which is disposed near said first bracing index.

20. A bezel comprising first and second sides that intersect at a first corner, and third and fourth sides that intersect at a second corner, said second and third sides intersecting at a third corner, and said first and fourth sides intersecting at a fourth corner, wherein:
    said first side comprises a first bracing index and said second side comprises a second bracing index;
    said first bracing index comprises a first body having a first ridged surface disposed at an acute angle relative to a front surface of said first side, said first ridged surface comprising a first multiplicity of ridges disposed at different distances from a back surface of said first side;
    said first body has a shape which approximates a truncated wedge having a pair of trapezoidal side faces, said first multiplicity of ridges being disposed on a first face that connects said trapezoidal side faces of said first body and extending perpendicular to said first side;
    said second bracing index comprises a second body having a second ridged surface disposed at an acute angle relative a front surface of said second side, said second ridged surface comprising a second multiplicity of ridges disposed at different distances from a back surface of said second side; and
    said second body has a shape which approximates a truncated wedge having a pair of trapezoidal side faces, said second multiplicity of ridges being disposed on a second face that connects said trapezoidal side faces of said second body and extending perpendicular to said second side.

21. The bezel as recited in claim 20, wherein said first bracing index has a length not greater than a width of said first side and said second bracing index has a length not less than a distance between said first and third sides.

22. The bezel as recited in claim 20, wherein:
    said third side comprises a third bracing index and said fourth side comprises a fourth bracing index;
    said third bracing index comprises a third body having a third ridged surface disposed at an acute angle relative to a front surface of said third side, said third ridged surface comprising a third multiplicity of ridges disposed at different distances from a back surface of said third side;
    said third body has a shape which approximates a truncated wedge having a pair of trapezoidal side faces, said third multiplicity of ridges being disposed on a third face that connects said trapezoidal side faces of said third body and extending perpendicular to said third side;
    said fourth bracing index comprises a fourth body having a fourth ridged surface disposed at an acute angle relative to a front surface of said fourth side, said fourth ridged surface comprising a fourth multiplicity of ridges disposed at different distances from a back surface of said fourth side; and
    said fourth body has a shape which approximates a truncated wedge having a pair of trapezoidal side faces, said fourth multiplicity of ridges being disposed on a fourth face that connects said trapezoidal side faces of said fourth body and extending perpendicular to said fourth side.

\* \* \* \* \*